United States Patent Office 3,782,950

Patented Jan. 1, 1974

3,782,950

PHOTOGRAPHIC MATERIAL

Erwin Ranz, Leverkusen, Wolfgang Himmelmann, Opladen-Lutzenkirchen, and Peter Bergthaller and Jurgen Hocker, Cologne, Germany, assignors to Agfa-Gevaert Aktiengesellschaft, Leverkusen, Germany No Drawing. Filed Mar. 10, 1972, Ser. No. 233,753

Claims priority, application Germany, Mar. 13, 1971, P 21 12 141.5

Int. Cl. G03c *1/70*

U.S. Cl. 96—85 9 Claims

ABSTRACT OF THE DISCLOSURE

Photographic layers containing a light-sensitive cyclic aryl polycarboxylic acid imide and a compound having at least one olefinic double bond or having groups capable of forming olefinic double bonds upon exposure become less soluble or less swellable upon exposure at the light-struck areas. A relief image is obtained after removal of the unexposed areas.

The invention relates to a process for the production of photographic images and to a light-sensitive material for carrying out the process, which material contains a cyclic aryl polycarboxylic acid imide as light-sensitive compound.

Numerous processes are known in which light-sensitive organic substances are used for producing an image. Some of these processes are based on photochemical rearrangements or reactions of organic compounds resulting in a color change. Such photochemical reactions of organic compounds have been comprehensively described, e.g. in "Präparative organische Photochemie" (A. Schonberg, Springer Verlag 1958) and "Light-Sensitive Systems" (J. Kosar, John Wiley and Sons, New York, 1965).

These reactions include, for example, the formation of monomethine dyes by the photolysis of trihalomethyl compounds in UV light in the presence of aromatic or heterocyclic compounds which by virtue of their constitution have CH ring members which are particularly reactive in condensation or diazo coupling reactions.

The systems previously known are only of limited utility because their sensitivity to light is generally too low.

A certain improvement has already been provided by the light-sensitive materials described in U.S. patent specification No. 3,533,798. The materials contain cyclic imides of aryl polycarboxylic acids whose imide nitrogen is substituted by olefinically unsaturated linear or cyclic aliphatic groups.

The last mentioned photographic processes, however, do not satisfy the practical requirements as regards the sensitivity to light of the materials used.

It is among the objects of the present invention to provide light-sensitive photographic materials which are free from silver halide, which have sufficient sensitivity to light, and which yield deeply colored photographic images by a rapid and simple process.

We now have found a photographic material comprising a light-sensitive layer containing a supported cyclic light-sensitive aryl polycarboxylic acid imide on a support the said material comprising on a transparent or opaque support, a pigment layer with a pigment whose color provides a high contrast to the support, the light-sensitive cyclic aryl polycarboxylic acid imide being present either in this pigment layer or in a separate contiguous layer above the pigment layer, wherein the light-sensitive layer contains compounds which have at least one olefinic double bond or groups capable of forming olefinic double bonds when exposed to light in the presence of the cyclic aryl polycarboxylic acid imides and which will undergo polymerization or cross-linking at room temperature in the presence of the exposed aryl polycarboxylic acid imides.

According to a preferred embodiment of the invention, the support is white in color or contains a white pigmented layer, e.g. a baryta-coated paper with a deep blue to black pigmented layer arranged on such a support.

The photographic material described above is processed as follows: The material is first exposed imagewise, a dark colored image being formed in the exposed areas by photolytic reaction of the aryl polycarboxylic acid imide. The material is then treated with a solvent for the binder of the layer so that the unexposed parts of the layer, which have remained unchanged, are washed out. The high contrast pigmented or transparent layer support is thus laid free in these areas of the layer. In the case of a black pigmented light-sensitive layer on a support of baryta paper, for example, a deep colored negative image of the original is obtained. If, conversely, a white pigmented layer is arranged on a dark support, a positive image of the original is obtained since the colored support is laid free in the unexposed areas.

Compounds of the following formula are particularly suitable light-sensitive cyclic aryl polycarboxylic acid imides:

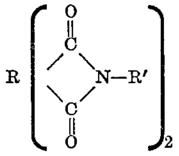

In the above formula:

R=aryl with one or more condensed benzene rings, preferably a group of the benzene or naphthalene series which may be substituted, e.g. with alkyl, especially alkyl with up to 5 C-atoms such as methyl, ethyl or propyl, with halogen such as chlorine or bromine or with nitrile or alkoxy, especially alkoxy with up to 5 C-atoms;

R'=(I) XZ, (II) hydrogen, (III) a saturated or olefinically unsaturated aliphatic group having preferably up to 18 C-atoms such as methyl, ethyl, propyl, butyl, pentyl, hexyl, dodecyl or allyl, butenyl or pentenyl, (IV) a saturated or unsaturated cycloaliphatic radical such as cyclopentyl, cyclopentenyl, cyclohexyl or cyclohexenyl, (V) a dihydropyran radical in which the above cyclic radicals may be directly attached to the nitrogen atom or via an alkylene bridge and, (VI) a 5-membered or 6-membered ring which has a cyclopropane group preferably with an endomethylene structure in addition, e.g. a ring of the tricyclene series such as tricyclene or nortricyclene;

wherein

X=(I) a saturated or olefinically unsaturated aliphatic chain having preferably up to 5 C-atoms, which chain may be interrupted by hetero atoms such as oxygen, sulfur or the group $>NR^{II}$, phenylene rings or cycloaliphatic rings, (II) a saturated or unsaturated cycloaliphatic radical such as divalent cyclopentane or cyclohexane and (III) a single chemical bond; and $$Z = —OR^{II},\ —N\begin{matrix} R^{II} \\ R^{III} \end{matrix} \text{ or nitrile}$$

wherein $R^{II}$=hydrogen, a saturated or olefinically unsaturated aliphatic group having preferably up to 5 C-atoms, especially methyl or cycloalkyl, e.g. cyclopentyl or cyclohexyl;

$R^{III}$=an aliphatic saturated or olefiniaclly unsaturated group having preferably up to 5 C-atoms, especially methyl or cycloalkyl such as cyclopentyl or cyclohexyl;

or $R^{II}$ and $R^{III}$ may together denote the ring members required for completing a saturated heterocyclic ring, especially one of the following rings: azocyclopropane, pyrrolidine, morpholine, thiamorpholine, piperidine or piperazine; these rings may contain a keto group as in the case of cyclic carboxylic acid imides.

Particular utility is exhibited by the following compounds:

(LV-1)

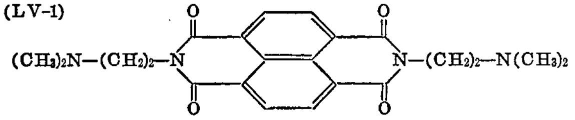

(LV-2)

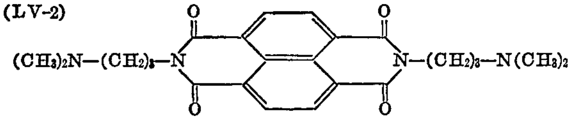

(LV-3)

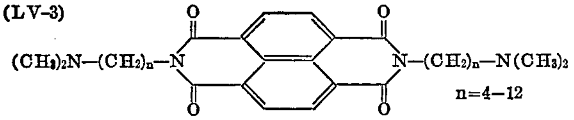

(LV-4)

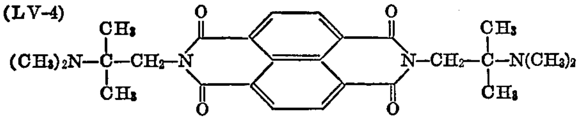

(LV-5)

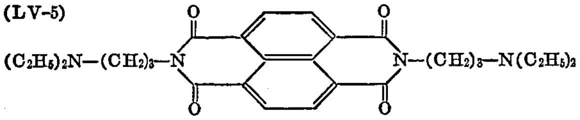

(LV-6)

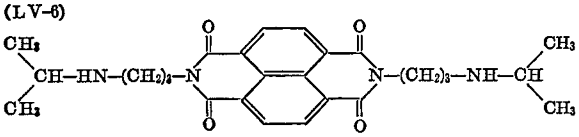

(LV-7)

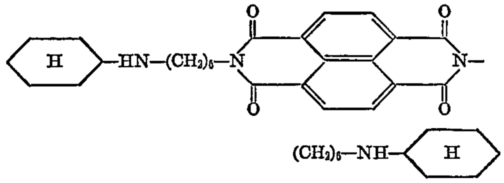

(LV-8)

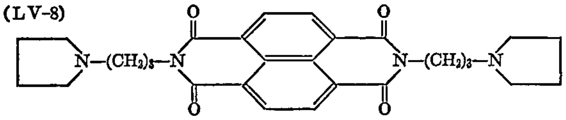

(LV-9)

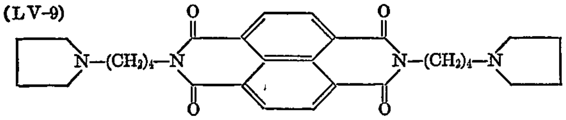

(LV-10)

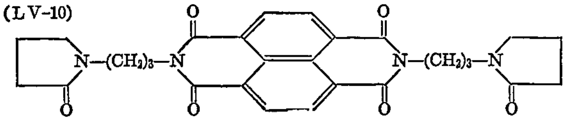

(LV-11)

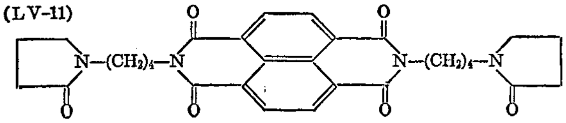

(LV-12)

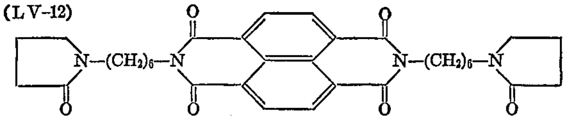

(LV-13)

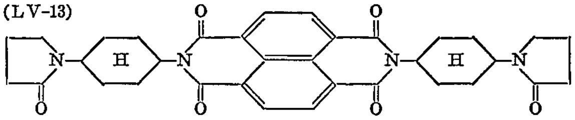

(LV-14)

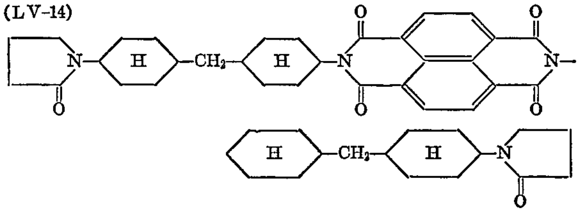

(LV-15)

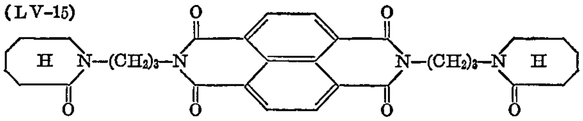

(LV-16)

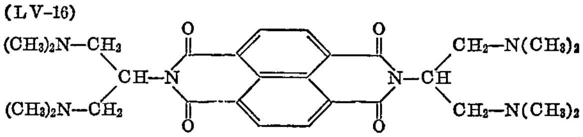

(LV-17)

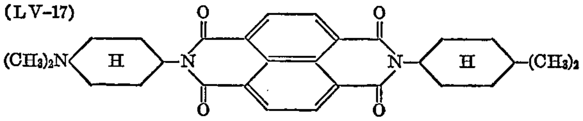

(LV-18)

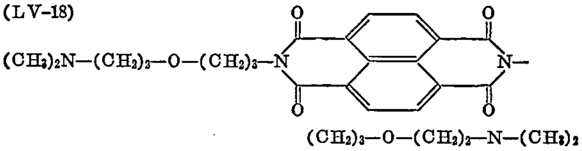

(LV-19)

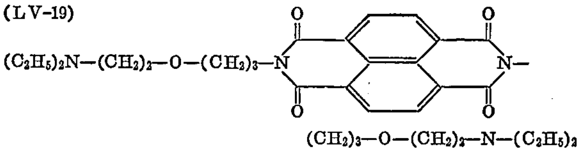

(LV-20)

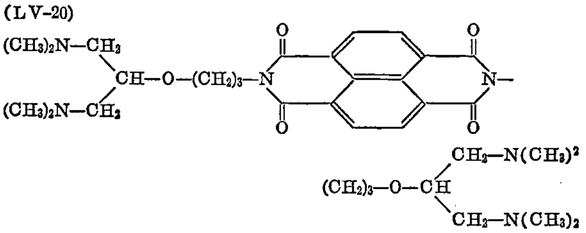

(LV-21)

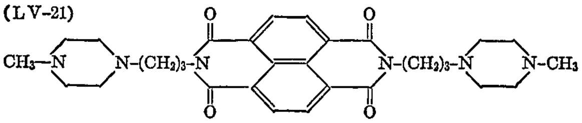

(LV-22)

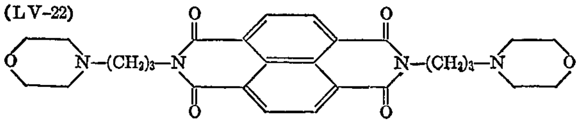

(LV-23)
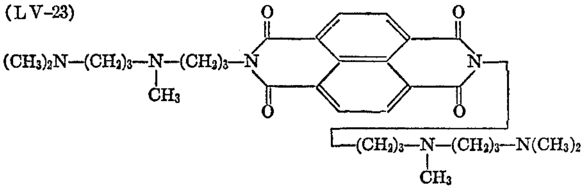
(LV-24)
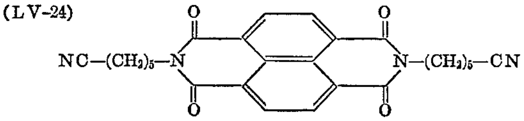
(LV-25)
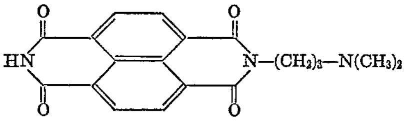
(LV-26)
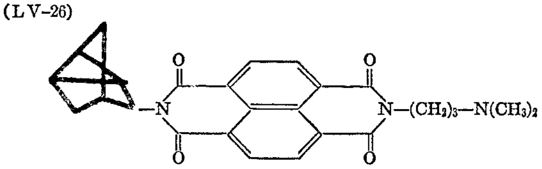
(LV-27)
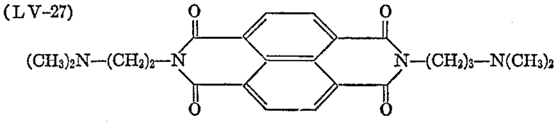
(LV-28)
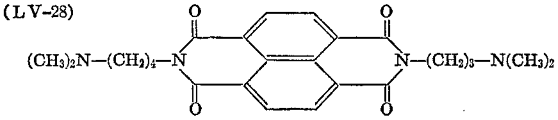
(LV-29)
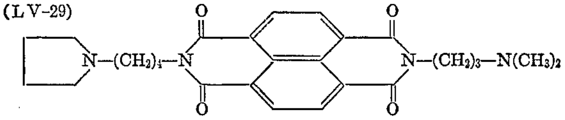
(LV-30)
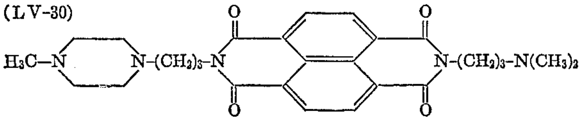
(LV-31)
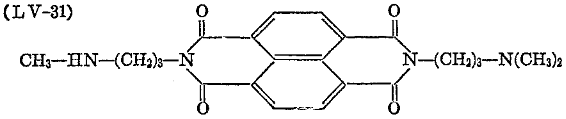
(LV-32)
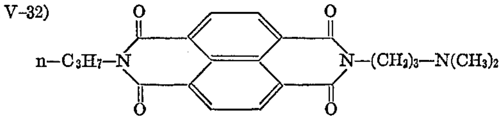
(LV-33)
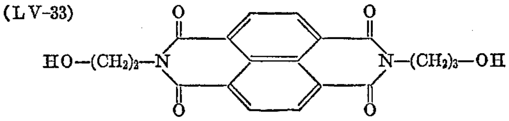
(LV-34)
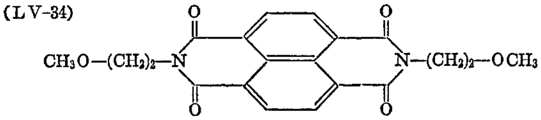
(LV-35)
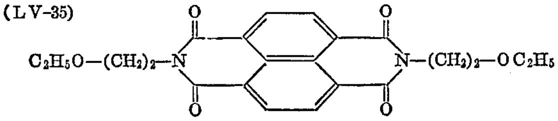
(LV-36)
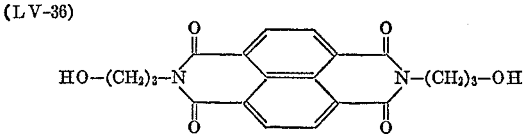
(LV-37)
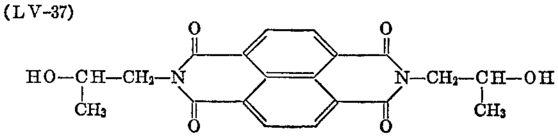
(LV-38)
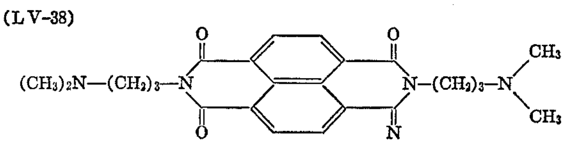
(LV-39)
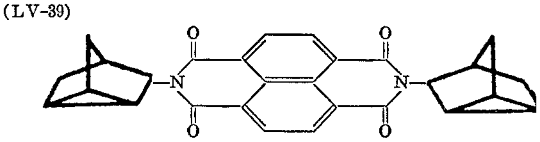
(LV-40)
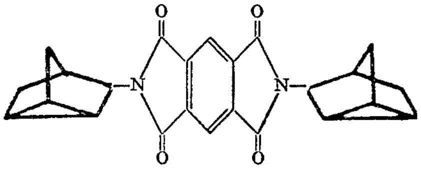
(LV-41)
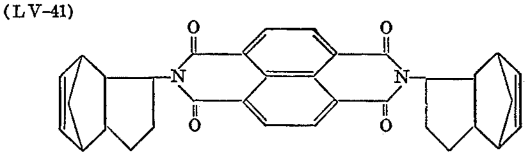
(LV-42)
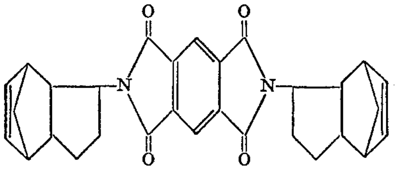
(LV-43)
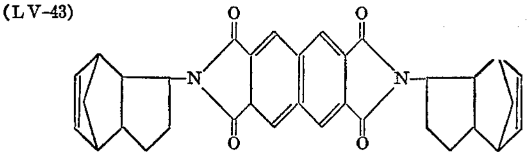
(LV-44)
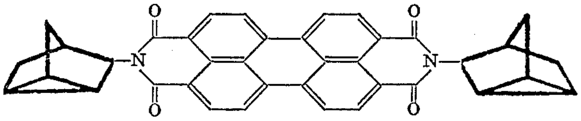
(LV-45)
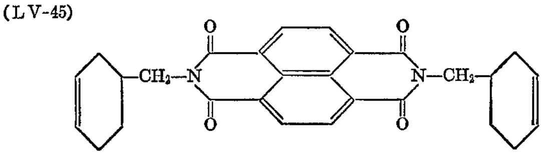
(LV-46)
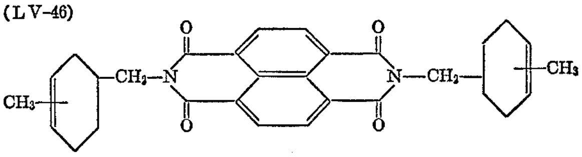

(LV-47)

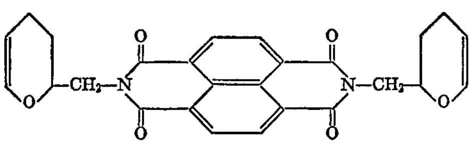

(LV-48)

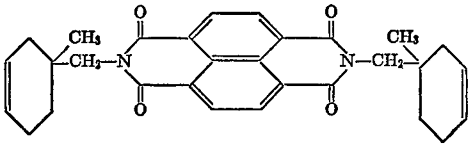

(LV-49)

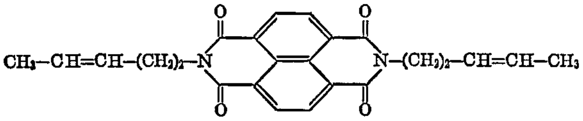

(LV-50)

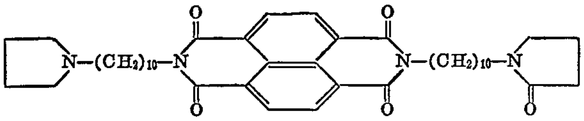

(LV-51)

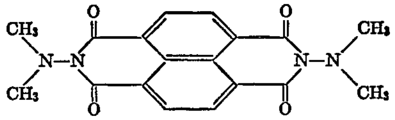

(LV-52)

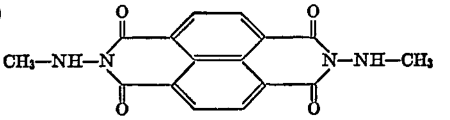

(LV-53)

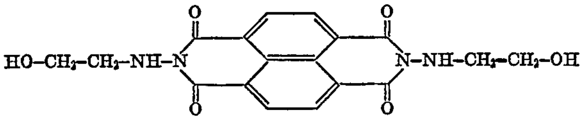

(LV-54)

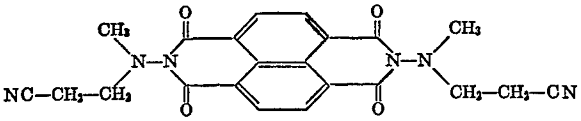

The compounds for use according to the invention may be prepared by various known processes, e.g. by reacting naphthalene-1,4,5,8-tetracarboxylic acid dianhydride or the corresponding naphthalene-1,4,5,8-tetracarboxylic acid with the corresponding amines in the presence of a suitable solvent or in a melt. Solvents such as ethanol, dimethyl formamide or N-methyl pyrrolidone, which take up the water formed in the reaction, may be used; toluene or xylene, by means of which the water of reaction can easily be removed by azeotropic distillation at the boiling point in a water separator, are also suitable solvents. The preparation of basic alkylated naphthalene-1,4,5,8-tetracarboxylic acid diimides has been described, for example, in German Pat. No. 1,195,762 (U.S. Ser. No. 307,799) in German Pat. No. 1,195,762 (U.S. Ser. No. 307,799).

The preparation of a few representative compounds is described in detail below. The other compounds are prepared in analogous manner.

COMPOUND 2

10.2 parts by weight of 3-amino-1-dimethylaminopropane are dissolved in 150 parts by weight of dimethyl formamide. 13.4 parts by weight of naphthalene-1,4,5,8-tetracarboxylic acid dianhydride are introduced in portions into the solution at room temperature, the temperature rising from 25° C. to 35° C. The reaction mixture is then heated under reflux for 2 hours. When cold, it is filtered and the residue is washed with alcohol. 19.5 parts by weight of pale yellow, crystals of Compound 2 are obtained, M.P. 226° C. to 228° C. The IR spectrum and elementary analysis confirm the postulated structure.

COMPOUND 11

15.6 parts by weight of N-(4-aminobutyl)-pyrrolidone in 150 parts by volume of ethanol are reacted with 13.4 parts by weight of naphthalene-1,4,5,8-tetracarboxylic acid dianhydride by a method analogous to that used for Compound 2 to form the diimide. The reaction product is obtained in the form of colourless crystals of melting point 217° C. in a yield of 24.2 parts by weight.

Asymmetrically substituted naphthalene-1,4,5,8-tetracarboxylic acid diimides are prepared by first preparing the mixed anhydride imide (Stage A):

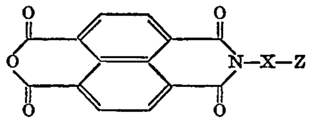

(Stage A)

and then reacting this with a second, suitable substituted amine to form the asymmetrically substituted imide. Stage A may be prepared, for example, by reacting naphthalene-1,4,5,8-tetracarboxylic acid dianhydride in a suitable solvent with the quantity of an amine corresponding only to one anhydride group. Thereafter, the product is reacted with a second amine different from the first to yield the asymmetrically substituted imide, this second reaction being carried out either after isolation of Stage A or the two reactions being carried out as a single stage process. The preparation of some representative compounds is described in detail below. The other compounds are prepared in a similar manner.

COMPOUND 26

Stage A: 26.8 parts by weight of naphthalene-1,4,5,8-tetracarboxylic acid dianhydride are dissolved in 900 parts by volume of dimethyl formamide with heating, and 10.2 parts by weight of 3-amino-1-dimethylaminopropane are added dropwise at reflux temperature. The reaction mixture is then stirred for 2 hours under reflux. When cold, the reaction mixture is suction-filtered and the residue is washed with 120 parts by volume of alcohol. 19.7 parts by weight of the asymmetric compound:

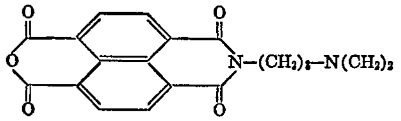

of melting point 295° C. are obtained. The IR spectrum and elementary analysis ($N_{theoretical}=7.96\%$, $N_{found}=7.9\%$)

confirm the assumed structure. The substance is slightly light-sensitive.

17.6 parts by weight of the compound described above (Stage A) are reacted with 5.45 parts by weight of nortricyclylamine in 150 parts by volume of dimethyl formamide and heated under reflux for 4 hours. When the reaction mixture is cold, it is suction-filtered and the filter residue is washed with alcohol. 18.2 parts by weight of pale yellow crystals of Compound 26 are obtained, M.P. 237° C. to 239° C. Its structure is confirmed by the IR spectrum.

COMPOUND 30

Stage A: 30.4 parts by weight of naphthalene-1,4,5,8-tetracarboxylic acid are dissolved in a solution of 200 parts by weight of crystalline sodium acetate and 900 parts by volume of water with heating, and 10.2 parts by weight of 3-amino-1-dimethylaminopropane are added dropwise at 75° C. in the course of 15 minutes. The reaction mixture is then stirred for 10 hours at 75° C. After cooling, the reaction mixture is filtered from a slight ground deposit, then made strongly acid with concentrated hydrochloric acid and boiled for 30 minutes. After cooling with ice, the reaction mixture is suction-filtered and the residue is washed with alcohol and dried. 31.6 parts by weight of the compound:

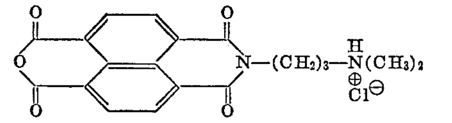

of M.P.=288° C. are obtained.

15.7 parts by weight of N-methyl-N'-3-aminopropyl piperazine are added dropwise at room temperature to 19.4 parts by weight of the compound described above dissolved in 150 parts by volume of dimethyl formamide, the temperature rising from 28° C. to 48° C. The reaction mixture is thereupon heated under reflux for 4 hours, in the course of which the product precipitates. After cooling, the precipitate is isolated by suction filtration, washed with 80 parts by volume of alcohol and dried. 24.3 parts by weight of pale yellow crystals of Compound 30 are isolated, M.P. 210° C. to 213° C., the structure of the product is confirmed by the IR spectrum and elementary analysis.

Preparation of Compound LV-51

12.0 parts by weight of N,N-dimethylhydrazine are added dropwise to 26.8 parts by weight of naphthalene-1,3,5,8-tetracarboxylic acid dianhydride in 150 parts by volume of dimethylformamide at room temperature, the temperature then rising from 25° C. to 62° C. The resulting reaction mixture is heated under reflux for 2 hours, cooled and filtered through a suction filter to isolate 32 parts by weight of orange yellow crystals of Compound LV-51. Elementary analysis, IR spectrum and NMR spectrum confirm the structure.

The preparation of some other compounds shown in the above table has been described in U.S. patent specification No. 3,533,798.

The compounds used in combination with the light-sensitive cyclic aryl polycarboxylic acid imides, which compounds contain at least one olefinic double bond or groups capable of forming at least one such double bond may be present in the form of monomers or polymers. Polymerisation and/or cross-linking occurs in the presence of the exposed aryl polycarboxylic acid imides. Monomeric compounds of this type may, if desired, be added together with the light-sensitive compound to the casting solution for the layer, which solution in addition contains the layer binder. If the compounds which contain double bonds or groups capable of forming double bonds on exposure to light are used as polymers, the use of a layer binder may be omitted if these compounds themselves have layer forming properties.

(A) Low molecular weight compounds: Compounds of the following formulae are examples of suitable monomeric compounds with olefinic double bonds:

(I) $CH_2{=}C(R^V){-}CO{-}R^{IV}$ (II)

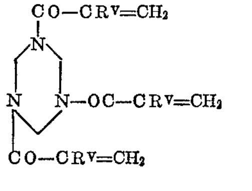

(III) $CH_2{=}CR^V{-}SO_2{-}Z'{-}SO_2{-}CR^V{=}CH_2$ (IV)

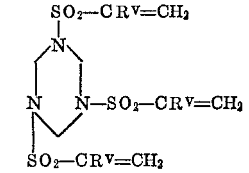

(V) $CH_2{=}CR^V{-}CO{-}Z'{-}CO{-}CR^V{=}CH_2$ wherein $R^{IV}$=hydroxyl, alkoxy with preferably up to 5 C-atoms, especially methoxy or ethoxy, aroxy, especially phenoxy, or an amino group, which amino group may be substituted one or more times, e.g. with alkyl preferably having up to 5 C-atoms, especially with methyl or ethyl, the alkyl groups may themselves carry further substituents, e.g. acyl, especially acyl groups of unsaturated aliphatic carboxylic acids particularly having up to 5 C-atoms such as acryloyl or methacryloyl;

$R^V$=hydrogen or alkyl, especially short chain alkyl with up to 5 C-atoms such as methyl or ethyl;

Z'=any organic bridge group, especially an aliphatic bridge with up to 6 C-atoms; the aliphatic bridge may be interrupted by hetero atoms, e.g. by oxygen, sulfur, sulfonyl or imino, and the imino group may be substituted e.g. with alkyl, or it may be in the form of a cyclic imino group as in the case of piperazinyl or hexahydrotriazinyl groups, or the imino group may be in the form of an ammonium group;

Z' may also represent an imino group optionally substituted with alkyl or aryl, especially with phenyl, or it may represent an ammonium group which may also be present in a cyclic form as in the case of piperazinyl or hexahydrotriazinyl, or it may represent the group $-NH-(CH_2)_{1-10}-NH-$.

Specific examples are given in the table under A(1)–A(24).

Compounds of the following formulae are examples of suitable monomeric compounds which may form olefinic double bonds:

(VI) $Y{-}CH_2{-}CH_2{-}CO{-}Z'{-}CO{-}CH_2{-}CH_2{-}Y$ (VII)

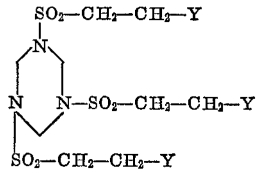

(VIII)

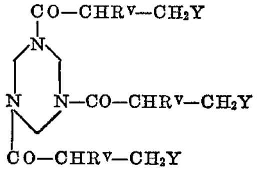

(IX) Reaction products of II, IV and V with 1, 2 and 3 mols of tertiary ammonium salts.

(X) $Y{-}CH_2{-}CH_2{-}N(R){-}CO{-}N(R){-}CH_2{-}CH_2{-}Y$ (XI) $Y{-}CH_2{-}CH_2{-}SO_2{-}Z'{-}SO_2{-}CH_2{-}CH_2{-}Y$ (XII) $\overset{\oplus}{S}(CH_2{-}CH_2{-}OSO_3^{\ominus})(CH_2{-}CH_2{-}OSO_3^{\ominus}Na^{\oplus})(CH_2{-}CH_2{-}OSO_3^{\ominus}Na^{\oplus})$ wherein Y=(I) an amino or ammonium group which may be substituted e.g. with alkyl having up to 5 C-atoms, or it may be in cyclic form, e.g. in the following groups:

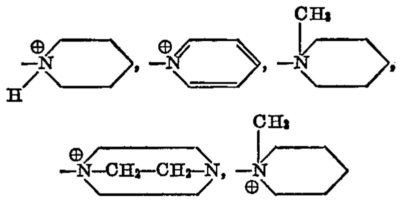

in each case with an anion, the nature of the anion in the ammonium groups being immaterial, suitable anions being e.g. halide anions, sulfates etc; (II) carbalkoxy, especially those carbalkoxy groups which are derived from short chained aliphatic carboxylic acids having preferably up to 5 C-atoms, e.g. from acetic acid or halogenated acetic acids, especially chlorinated acetic acids, (III) halogen such as fluorine, chlorine, bromine or iodine or (IV) sulfate.

Compounds A(25)–A(34) shown in the table below are examples of particularly suitable compounds.

(A-1) $CH_2=CH-CO-NH-CO-CH=CH_2$ (A-2)

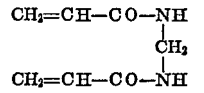

(A-3) $CH_2=CH-CO-OC_2H_5$ (A-4) $CH_2=CH-CONH_2$ (A-5)

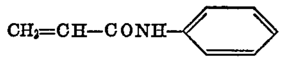

(A-6) $CH_2=C(CH_3)-CO-NH_2$ (A-7) $CH_2=CCH_3-CO-NH-CO-C(CH_3)=CH_2$ (A-8) $CH_2=C(CH_3)-CONH-CH_2-NH-CO-C(CH_3)=CH_2$ (A-9) $CH_2=C(CH_3)-CO-NH-CH_2-CH_2-NH-CO-C(CH_3)=CH_2$ (A-10)

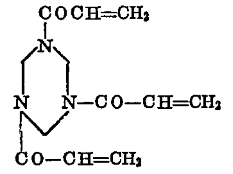

(A-11)

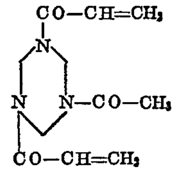

(A-12)

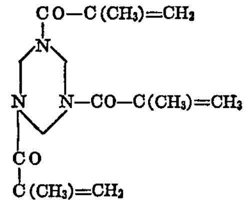

(A-13)

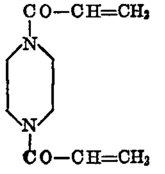

(A-14) $CH_2=CH-SO_2-CH=CH_2$ (A-15)

$CH_2=CH-SO_2-CH_2-CH_2-NH-CH_2-CH_2-NH-CH_2-CH_2-SO_2-CH=CH_2$ (A-16)

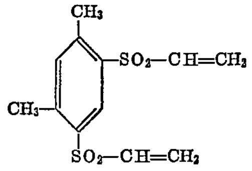

(A-17)

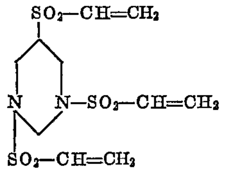

(A-18)

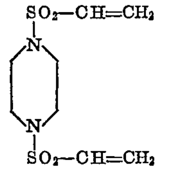

A(-19)

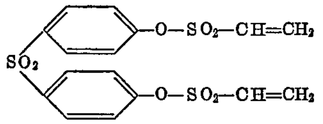

(A-20) $CH_2=CH-COO-(CH_2)_2-OOC-CH=CH_2$ (A-21)

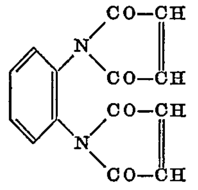

(A-22)

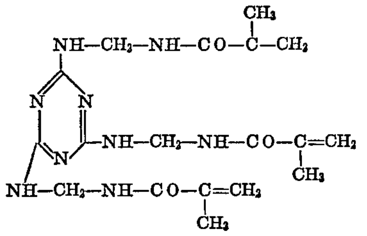

(A-23)

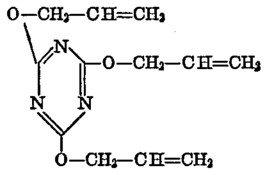

(A-24)

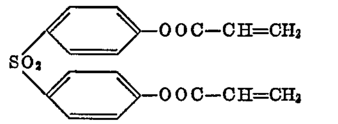

(A-25)

$Cl-CH_2-CH_2-CO-NH-CH_2-NH-CO-CH_2-CH_2-Cl$ (A-26)

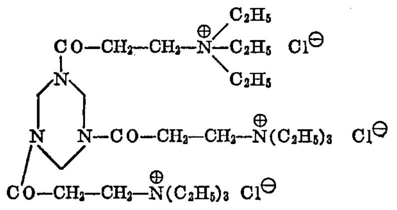

(A-27)

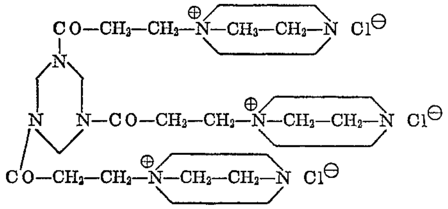

(A-28)

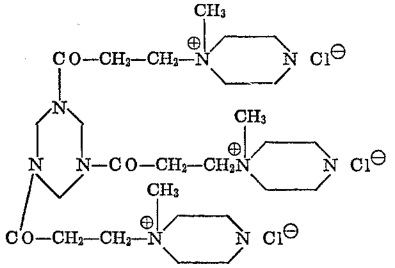

(A-29)

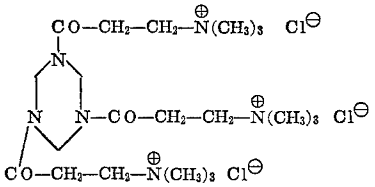

(A-30)

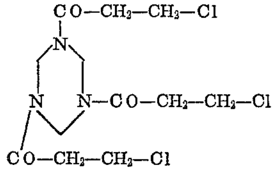

(A-31)

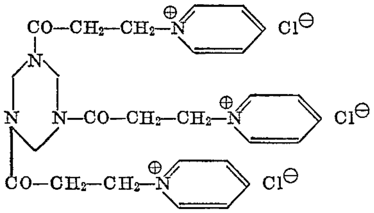

(A-32)

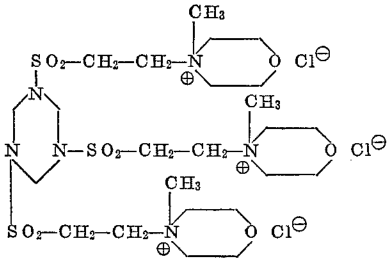

(A-33)

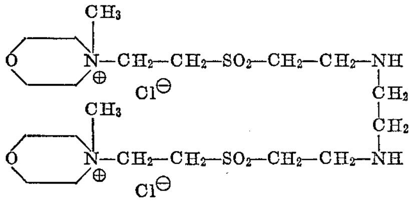

(A-34)

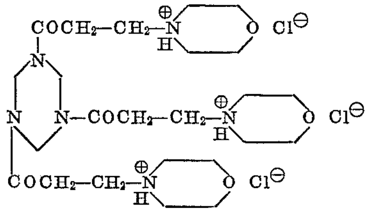

The compounds are known. Compounds A–26 through A–34 may be prepared by conventional methods, either via the corresponding halides or toluene sulfonates, by reaction with tertiary or secondary amines, or in some cases by the adidtion of salts of tertiary amines to the compound which contains double bonds. Compounds which may be obtained by reacting salts of tertiary amines with tris-acryloyl-hexahydrotriazine in aqueous solutions have been found to be especially suitable.

(B) High molecular weight compounds: The olefinic double bonds or groups which form olefinic double bonds may also be bound chemically to the binder molecule, e.g. via oxygen or imido groups, in other words they may form ester, acetal or amide type bonds. Such compounds are obtained by reacting layer-forming polymers containing OH groups or amino groups with acid derivatives which contain C=C double bonds such as acid halides, anhydrides and isocyanates or by reacting them with aldehydes. Reaction products of acrylic and methacrylic acid halides with polysaccharides, especially with cellulose derivatives or starch derivatives such as hydroxyethyl cellulose, hydroxypropyl cellulose, hydroxyethyl starch, hydroxypropyl starch, alginic acid, hydroxylethyl alginic acid, methyl cellulose, carboxymethylcellulose, starch ether or synthetic polymers which contain hydroxyl or amino groups, such as polyvinyl alcohol, partially saponified polyvinyl acetates, partially saponified copolymers of vinyl acetate/vinyl pyrrolidone, vinylacetones/ethylene, vinylacetate/acrylic acid or vinyl acetate/crotonic acid are found to be especially suitable. $\beta$-Halopropionic acid esters of cellulosic ethers which can be converted into the corresponding unsaturated compounds by splitting off HCl, or maleic acid esters of the above mentioned compounds, may also be used.

The compounds are prepared by reacting the corresponding high molecular weight compound in a suitable solvent such as dioxane or toluene with the corresponding acid halide in the presence of an acid acceptor such as triethylamine and then isolating the product. The reaction is carried out in the dark. The compounds are stored in solution with exclusion of light because they easily undergo cross-linking in solid form. The corresponding carbamic acid esters and acetals may also be prepared by conventional methods.

The high molecular weight compounds which contain olefinic polymerizable groups may be used alone or together with other binders. They may also be used together with low molecular weight compounds of the type described under A.

COMPOUND B–1

Reaction product of hydroxypropyl cellulose with 10% by weight of acrylic acid chloride.

400 g. of hydroxypropyl cellulose (e.g. the product marketed by Hercules Powder under the trade name Klucel G) are dissolved in 10 l. of anhydrous dioxane in a flask and 45 g. of triethylamine are added to the mixture.

40 g. of acrylic acid chloride in 20 0cc. of dioxane are added dropwise at 10° C. with stirring. The mixture is stirred overnight at room temperature. The reaction product precipitates. It is centrifuged and the residue is dissolved in water and the compound is reprecipitated by the addition of a concentrated sodium chloride solution. The residue is again dissolved in water with the addition of acetone and the mixture is dialyzed for 3 hours. Yield 250 g.

COMPOUND B–2

Reaction product of hydroxypropyl cellulose with 10% by weight of methacrylic acid chloride.

200 g. of hydroxypropyl cellulose are left to swell in 1 l. of dried toluene at room temperature for one hour.

22 g. of triethylamine are introduced into the dispersion with stirring and the mixture is then cooled to 10° C.

After the dropwise addition of 20 g. of methacrylic acid chloride dissolved in 100 ml. of toluene, the mixture is stirred at room temperature for another 12 to 14 hours. The reaction product is then removed by suction filtration and suspended twice with toluene. It is isolated by suction filtration and the filter cake is washed with ether and dried in air. The resulting compound is dissolved in water at 10° C. and the highly viscous solution is dialyzed for several hours against tap water (3 to 4% solution). Yield: 190 g.

COMPOUND B–3

Reaction product of hydroxypropyl cellulose with maleic acid anhydride.

50 g. of hydroxypropyl cellulose was dissolved in 160 cc. of formamide and
300 c. of acetone at 60° C. with stirring. The solution is cooled to room temperature and
30 g. of anhydrous sodium acetate are added.

A solution of 30 g. of maleic acid anhydride in 40 cc. of formamide is added dropwise in the course of 2 hours at about 30° C. with cooling. The reaction mixture is then stirred for 17 hours. The reaction product is precipitated with acetone and triturated with acetone. After suction filtration, a 5% solution of the product in water is prepared. The low molecular weight constituents are removed by dialyzing for several hours. Yield: 45 g. (3.2% solution).

The following Compounds B–4 through B–6 are prepared in a similar manner.

COMPOUND B–4

Reaction product of hydroxyethyl cellulose (e.g. the product marketed by Hercules Powder under the trade name Natrosol 250 MR) with 5% by weight of methacrylic acid chloride. Yield approximately 90%.

COMPOUND B–5

Reaction product of hydroxypropyl cellulose with 20% by weight of β-chloropropionic acid chloride. Yield approximately 90%.

COMPOUND B–6

Reaction product of hydroxyethyl cellulose with 5% by weight of cinnamic acid chloride. Yield approximately 90%.

COMPOUND B–7

Reaction product of hydroxypropyl cellulose with 5% by weight of mucochloric acid, 1 g. of mucochloride acid in 10 ml. of dioxane and 0.5 g. of p-toluenesulfonic acid are added at room temperature to 20 g. of hydroxypropyl cellulose and 500 ml. of dioxane. After stirring for 18 hours, the reaction mixture is diluted with water and then dialyzed against tap water for 48 hours. Yield: 17 g. as 3% aqueous solution.

COMPOUND B–8

Reaction product of hydroxypropyl cellulose with β-isocyanato-ethyl methacrylate, 25 g. of hydroxypropyl cellulose are introduced into 300 ml. of toluene and left to swell for 2 hours.

25 g. of β-isocyanatoethyl methacrylate are then added dropwise with vigorous stirring and the mixture is heated at 50° C. for 4 hours. It is then cooled and the reaction product is removed by suction filtration and washed with ether. Yield: 22 g.

COMPOUND B–9

Reaction product of hydroxypropyl cellulose with β-isocyanato ethyl methacrylate in ethylene glycol dimethyl ether. 25 g. of hydroxypropyl cellulose are dissolved in 300 ml. of ethylene glycol dimethyl ether, and 2.5 g. of β-isocyanatoethyl methacrylate are added to the relatively viscous solution with constant stirring. The mixture is then heated at 40° C. for 4 hours. The product can be used immediately after cooling.

COMPOUND B–10

Reaction product of hydroxypropyl cellulose with chloroacetyl chloride in the presence of triethylamine, 20 g. of hydroxypropyl cellulose are left to swell in 100 ml. of toluene for 2 hours, 5 ml. of triethylamine are added, the mixture is cooled to 10° C. and 2.66 ml. of monochloroacetyl chloride are added dropwise. The reaction mixture is then stirred overnight and the product is removed by suction filtration, washed with ether, dissolved in water, dialyzed for 36 hours, separated from swelled particles and concentrated to 500 ml. by evaporation. Solids content: 7:55 g. (concentration 1.76% by weight).

COMPOUND B–11

Reaction product of hydroxypropyl cellulose with acrylic acid chloride, 20 g. of hydroxypropyl cellulose are left to swell in 100 ml. of toluene for 2 hours. 2.5 ml. of triethylamine are added, the reaction mixture is cooled to 10° C. and 2 g. of acrylic acid chloride dissolved in 20 ml. of toluene are added dropwise at 10° C. The reaction mixture is stirred for 6 hours and then filtered and the product is washed with ether, taken up in 1.2 l. of water, dialyzed for 36 hours, separated from swelled particles and concentrated to a volume of 500 ml. of solution by evaporation under vacuum at a temperature of below 40° C. Solids content: 16.3 g. (4.5% solution).

COMPOUND B–12

Reaction product of hydroxypropyl cellulose with acrolein, 20 g. of hydroxypropyl cellulose are dissolved in 500 ml. of dioxane. 2 g. of acrolein and a solution of 0.5 g. of p-toluenesulfonic acid in 10 ml. of dioxane are then added. The reaction mixture is stirred at room temperature for 24 hours, then diluted with water and dialyzed against tap water for 48 hours. The dialyzate is concentrated to a 4% solution at a temperature of up to 40° C.

COMPOUND B–13

Reaction product of hydroxypropyl cellulose with acrolein. Preparation the same as for Compound B–12 but 4 g. of acrolein are used.

Various binders are suitable for the light-sensitive photographic material according to the invention. The wide variety of suitable layer binders is also shown by the fact that both water-soluble binders and those which are soluble in organic solvents such as benzene, acetone, butanol, chloroform and ethyl acetate may be used. The use of water-soluble binders is, of course, preferred because it is simpler. Both synthetic and natural film forming products are suitable, e.g. proteins, especially gelatin, cellulose derivatives such as cellulose ethers or cellulose esters, e.g. methyl- or hydroxyethyl cellulose, carboxymethyl cellulose or the like, starch or starch derivatives such as starch ethers, alginic acid or derivatives thereof such as salts, especially alkali metal salts, esters or amides, carrageenates and the like.

Methacrylic or acrylic acid esters of cellulose ethers with short chained hydroxyalkyl ether residues, which are soluble in water, are preferred.

The effectiveness of the combination of light-sensitive cyclic arylpolycarboxylic acid imide, compounds which contain olefinic double bonds or groups capable of forming them in the course of processing (hereinafter known as accelerators) and binder depend, of course, to a certain extent on the choice of suitable components for this combination. The optimum combination for any given reproduction process can easily be determined by a few simple laboratory tests.

The concentration of components in the layer may vary within wide limits and also depends on the requirements of the given reproduction process. Quantities of from 200 to 1000 mg. of light-sensitive cyclic polyacrylcarboxylic acid imide per $m.^2$ of material have generally been found sufficient. The thickness of the light-sensitive layers is in the range of from 0.5 to 5 $\mu$m. The concentration of the accelerating compound can vary within wide limits, depending somewhat on the molecular weight of that compound. The low molecular accelerating compounds as referred hereinbefore are preferably added in an amount of 20–200% by weight based on the weight of the binding agent. High molecular accelerating compounds which are film-forming and which thus can be used as binders for the light-sensitive layer contain preferably between 0.5–30% by weight more particular 5–20% by weight of the accelerating groups attached to the polymer based on the total weight of the high polymer.

The light-sensitive aryl polycarboxylic acid imides may be contained in the pigment layer itself. This may be achieved e.g. by directly adding the arylpolycarboxylic acid imides to the pigment casting solution. Incorporation of the aryl polycarboxylic acid imides in the pigment layers is preferably carried out by bathing the finished pigment layers in solutions of aryl polycarboxylic acid imides in a suitable solvent in which the binder of the pigment layer is capable of swelling. According to another embodiment, the light-sensitive cyclic aryl polycarboxylic acid imides may be arranged in a separate layer above the pigment-containing layer. In this method, the binders used for the pigment layer may be the same as or different from those used for the light-sensitive layer. In that case it is, of course, necessary to ensure that the binders for the pigment layer are soluble in the same solvents as the binders of the light-sensitive layer so that both the light-sensitive layer and the pigment layer can be washed out in the unexposed areas to expose the differently colored layer support.

The usual products may be used as layer supports, e.g. cellulose esters such as cellulose acetate or cellulose butyrate, polyesters, especially those based on polyethylene glycol, terephthalates or polycarbonates, preferably those polycarbonates which are based on bis-phenylolalkanes, or paper layer supports, especially baryta-coated paper.

The support may be transparent or colored, preferably with those dyes which form a high contrast color with the color of the pigment layer itself. If a layer support with a dyed layer is used it is, of course, necessary to ensure that the binder for this layer differs substantially in its physical properties from the binder for the pigment layer and especially in its solubility, so that the dye layer of the layer support will not be damaged in processing.

The adherence between the pigment layer or light-sensitive layer and the support or the dyed layer of the support should not be too great in order that the unexposed parts of the light-sensitive layer or of the pigment layer may easily be washed out but on the other hand the adherence must be sufficiently strong to ensure that the layers will not separate from each other spontaneously. None of these factors, however, entails any fundamental difficulties. Suitable combinations of layers and binders for these layers can easily be found on the basis of the general technical knowledge available in this field.

Furthermore, there are no restrictions from a chemical point of view as regards the choice of suitable dyes or pigments for the layer supports for the pigment layer itself. As already mentioned above, the pigment in the pigment layer should contrast as much as possible with the color of the layer support. This is necessary in order to obtain a high contrast image. The dyes or pigments should preferably be insoluble in the solvents used in order that migration of the pigment into adjacent layers or parts of layers will not occur. It is, of course, necessary to ensure that the pigments in the pigment layer will not color the differently colored layer support during preparation of the material. If this did occur, an interfering background would be found in the parts of the layer support which are laid free by washing out the unexposed parts.

The sensitivity of the materials according to the invention extends from the ultraviolet to the visible region of the spectrum. Exposure may therefore be carried out with UV lamps, mercury vapor lamps, halogen lamps and flashlamps, for example. The length of exposure depends, of course, on factors such as the sensitivity of the light-sensitive compound and the distance of the source of light from the light-sensitive material. Exposure times of between 5 seconds and 1 to 2 minutes have generally been found sufficient. Times of between 5 and 20 seconds are sufficient for most materials in order to produce a good quality, high contrast image.

When the light-sensitive material is exposed, a visible image is immediately formed in the exposed areas and can immediately be assessed. These images either remain visible or disappear spontaneously; this depends on the nature of the diimide because the color change caused by the action of the nature of the diimide. A reversible change occurs e.g. in the case of cyclic aryl polycarboxylic acid imides in which the imide nitrogen is substituted with aminoalkyl groups. This reversible formation of an image may be of interest for various practical applications.

There is no need to heat the material after exposure if the mixtures or compounds (accelerators) according to the invention are used because cross-linking or polymerization already takes plate at room temperature.

The unexposed parts of the light-sensitive layer or pigment layer are washed out in a final stage of the process. This can usually be carried out with conventional apparatus by treating the material with a suitable solvent. As already mentioned above, ordinary tap water can be used for the preferred layer binders which are water-soluble. The treatment time required for washing out the unexposed areas also depends on the nature of the particular layer binder but times of about 5 seconds to 1 minute are generally sufficient.

In a special embodiment of the process according to the invention, removal of the unexposed parts of the layer may also be carried out by transferring these parts of the layer to a second support. This variation of the process is carried out by pressing the exposed layer together with a second layer support. The two sheets are then separated, the unexposed parts of the light-sensitive layer remaining behind on the second layer support. If this light-sensitive layer was black or dark in color, a non-reversed image of the original is immediately obtained on the second layer support. If this method is employed, the bonding properties of the layers must be adjusted relative to each other, that is to say the unexposed parts of the light-sensitive layer must adhere less firmly to their original support than to the second layer support while the reverse applied to the exposed parts of the layer. Since such processes of tearing out are well known in principle, the average expert can easily find suitable combinations of binders by a few simple tests.

In the process according to the invention, exposure may be performed according to common practice through transparent originals or by the usual method of light reflection in the case of opaque originals.

With suitable choice of components, times of between about 25 seconds and 1 minute are required for the whole process. Deeply colored stable photographic images are obtained. The process is extremely simple and operates without any development baths or any heat treatments.

For materials which are free from silver halides there is always the problem of stabilizing the image because light-sensitive compounds remain in the unexposed parts of the layers. In the case of silver halide emulsion layers, the silver halides can be removed from these parts of the layers by the usual fixing with silver halide solvents.

In the case of materials which are free from silver halides, removal of the compound or its conversion into products which are insensitive to light mostly involves considerable difficulties.

Another advantage is the exceptionally high light fastness of the colored images. Since there are practically no restrictions in the choice of dyes or pigments, light fast dyes such as those used e.g. for textiles may be used. Moreover, images can easily be obtained in any variety of colors on any colored background. With the large choice of known dyes available, any desired combination can be obtained.

Another advantages is that the same principle can be employed for obtaining either positive or negative copies according to the color of the layer support and of the pigment layer, If, for example, a dark pigment layer is used on a white layer support, a dark negative image is obtained on a light background since the dark pigment layer is washed out of the unexposed areas. If, on the other hand, a white pigment layer is used on a dark layer support, a positive image having the color of the dark layer support is obtained since the exposed areas remain white.

The high sensitivity of the material is a decisive advantage of this invention. This is achieved by virtue of the fact that even a very small quantity of light-sensitive compound sufficiently affects the physical properties of the layer on exposure.

The images obtained by the process according to the invention have a very steep gradation and are primarily suitable for producing copies of line originals.

EXAMPLE 1

Preparation of the light-sensitive material 18 g. of a fine blue pigment paste having a pigment content of 35% by weight, e.g. the paste marketed under the trade name Helioechtblau BV paste by Farbenfabriken Bayer AG (phthalocyannine pigment, Cu complex), are stirred into 500 ml. of water. 500 ml. of a 1% solution of hydroxypropyl cellulose (e.g. the product marketed by Hercules Powder under the tradename Klucel G) in ethyl alcohol are added. A solution of 20 g. of Compound A–10 in 200 ml. of dimethyl formamide is then added and the mixture is cast on a layer support of baryta-coated paper. The thickness of the layer when dry is 3$\mu$. A layer of light-sensitive compound LV–12 which is free from binder and which contains about 500 mg. of substance per m.$^2$ is then applied from a 1.5% solution in chloroform.

Processing: The material is exposed through a transparent original for 20 seconds, using a UV lamp (Osram HQA 400 w. KmZ.) at a distance of 20 cm. The layer is then passed through sponge rollers moistened with water (e.g. wash off apparatus Transparex W 20 of Agfa-Gevaert) to wash out the unexposed parts of the layer. A deep blue image is obtained on a white background.

EXAMPLE 2

Preparation of the light-sensitive material 15 g. of a fine black pigment paste having a pigment content of 35% by weight, e.g. Helioechtschwarz V paste of Farbenfabriken Bayer AG (lamp black pigment) are stirred into 500 ml. of water. 500 ml. of a 1% solution of hydroxypropyl cellulose (e.g. Klucel G) in ethyl alcohol are added. A solution of 20 g. of Compound A–20 in 200 ml. of dimethylformamide is then added and the mixture is cast on a layer support of polyester. The thickness of the layer when dry is 1$\mu$. A layer of Compound LV–26 which is free from binder and contains about 600 mg. of substance per m.$^2$ is applied to the dried pigment layer from a 1.5% solution in chloroform.

The material is processed as described in Example 1. A black image is obtained on a transparent support.

EXAMPLE 3

Preparation of the light-sensitive material 12 g. of a fine blue pigment paste having a pigment content of 45% by weight, e.g. Helioechtblau B, BT fine paste of Farbenfabriken Bayer AG (phthalocyanine pigment, Cu complex) are stirred into 500 ml. of water, and 500 ml. of a 1% aqueous solution of hydroxypropyl cellulose are added. A solution of 10 g. of Compound A–19 in 200 ml. of dimethylformamide and 40 ml. of a 10% aqueous solution of saponin are then added and the resulting mixture is cast on a layer support of baryta paper. The thickness of the layer when dry is 2$\mu$.

A layer of Compound LV–50 free from binder, containing about 700 mg. of substance per m.$^2$, is applied to the dried pigment layer from a 1.5% solution in chloroform.

Processing: The material is exposed by contact exposure through a transparent original by means of a flash gum (model Braun F 65) (exposure time $10^{-3}$ seconds).

The unexposed parts of the layer are then washed out as described in Example 1. A deep blue image on a white background is obtained.

EXAMPLE 4

Preparation of the light-sensitive material 15 g. of Compound A–10 are dissolved in a mixture of 125 ml. of ethyl alcohol and 50 ml. of water at 40° C. to 50° C. 15 g. of a fine blue pigment paste having a pigment content of 35% by weight, e.g. Helioechtblau BV paste of Farbenfabriken Bayer AG (phthalocyanine pigment, Cu complex) are then stirred in, using a high speed stirrer. 750 ml. of a 2.5% aqueous solution of hydroxyethyl cellulose (e.g. the product marketed by Hercules Powder under the trade name Natrosol® and 20 ml. of a 10% aqueous solution of saponin are then added and the mixture is cast on a layer support of baryta paper. The thickness of the layer when dry is 2$\mu$. A layer of Compound LV–12 which is free from binder and which contains about 500 mg. of substance per m.$^2$ is then applied to the dried pigment layer from a 1.5% solution in chloroform.

Processing: The material is exposed through a transparent original for 40 seconds, using a UV lamp (Osram HQA 400 w. KmZ.) at a distance of 20 cm. A moist sponge is then run over the layer to wash out the unexposed parts of the layer, A deep blue image is obtained on a slightly blue tinged white background.

EXAMPLE 5

Preparation of the light-sensitive material

A solution of 10 g. of Compound A–1 in 100 ml. of ethyl alcohol and 200 ml. of 1% aqueous solution of a hydroxypropyl cellulose are added to a solution of 10 g. of Compound A–4 in 70 ml. of water. 6 g. of a fine black pigment paste having a pigment content of 35% by weight, e.g. the paste marketed under the trade name Helioechtschwarz V paste by Farbenfabriken Bayer AG (lamp black pigment) are then stirred in, using a high speed stirrer. After the addition of 10 ml. of a 10% aqueous solution of saponin, the mixture is cast on a layer support of baryta paper. The thickness of the layer when dry is 3$\mu$. A layer of Compound LV–50 which is free from binder and which contains about 700 mg. of substance per m.$^2$ is applied to the dried pigment layer from a 1.5% solution in chloroform.

Processing: Processing is the same as described in Example 1. Exposure time 60 seconds. A deep black image is obtained on a white background.

EXAMPLE 6

Preparation of the light-sensitive material 15 g. of a fine blue pigment paste having a pigment content of 35% by weight, e.g. Helioechtblau BV paste of Farbenfabriken Bayer AG (phthalocyanine pigment, Cu complex) are stirred into 600 ml. of ethylene glycol monomethyl ether, using a high speed stirrer. 150 g. of a 3.8% aqueous solution of compound B–1 and 600 ml. of ethyl alcohol are then added and the mixture is cast on a layer support of baryta-coated paper. The thickness of the layer when dry is 3$\mu$. A layer is then applied to the dried pigment layer from a casting solution consisting of 2.5 g. of light-sensitive Compound LV–12, 140 ml. of chloroform and 10 ml. of 0.5% hyroxypropyl cellulose in chloroform, the layer containing about 500 mg. of LV–12 per m.$^2$.

Processing: The material is exposed through a transparent original for 30 seconds using a UV lamp (Osram HQA 400 w. KmZ.) at a distance of 20 cm. The layer is then passed through sponge rollers moistened with water (e.g. wash off apparatus Transparex W 20 of Agfa-Gevaert AG). The unexposed parts of the layer are thereby washed out. A deep blue image is obtained on a white background.

EXAMPLE 7

Preparation of the light-sensitive material 10 g. of a fine black pigment paste having a pigment content of 35% by weight, e.g. Helioechtschwarz V paste of Farbenfabriken Bayer AG (lamp black) are stirred into 600 ml. of ethylene glycol monomethyl ether, using a high speed stirrer. 200 g. of a 1.3% aqueous solution of Compound B–4 and 600 ml. of ethyl alcohol are then added and the mixture is cast on a subbed layer support of polyester. The thickness of the layer when dry is 1$\mu$.

A layer of compound LV–26 which is free from binder and which contains about 600 mg. of substance per m.$^2$ is applied to the dried pigment layer from a 0.5% solution in chloroform.

Processing: The material is exposed once through a transparent original in contact, using a flashgun (exposure time $10^{-3}$ seconds). The unexpected parts of the layer are then washed out as described in Example 6. A black image is obtained on a transparent support.

EXAMPLE 8

Preparation of the light-sensitive material 12 g. of a fine green pigment paste having a pigment content of 40% by weight, e.g. the paste marketed under the trade name Helioechtgrün GV paste by Farbenfabriken Bayer AG (phthalocyanine pigment, halogenated Cu complex) are stirred into 600 ml. of ethylene glycol monoethyl ether, using a high speed stirrer. 400 g. of a 1.8% aqueous solution of Compound B–10 and 600 ml. of ethyl alcohol are then added and the mixture is cast on a layer support of baryta-coated paper. The thickness of the layer when dry is 2$\mu$.

A layer of Compound LV–11 which is free from binder and which contains about 650 mg. of substance per m.$^2$ is applied to the dried pigment layer from a 1.5% solution in chloroform.

Processing: Exposure and washing out were effected as described in Example 6. A green image is obtained on a white background.

EXAMPLE 9

Preparation of the light-sensitive material 12.5 g. of a fine blue pigment paste having a pigment content of 45% by weight, e.g. the paste marketed under the trade name Helioechtblau B, BT fine paste by Farbenfabriken Bayer AG (phthalocyanine pigment, Cu complex) are stirred into 1200 ml. of water. 250 ml. of a 3.2% aqueous solution of Compound B–3 are then added and the mixture is cast on a subbed layer support of cellulose triacetate. The thickness of the layer when dry is 2$\mu$. A layer of Compound LV–12 which is free from binder and which contains about 500 mg. of substance per m.$^2$ is applied to the dried pigment layer from a 1.5% solution in chloroform.

Processing: The material is exposed through a transparent original for 60 seconds, using a UV lamp (Osram HQA 400 w. KmZ.) at a distance of 20 cm. The layer is then passed through sponge rollers moistened with water to wash out the unexposed parts of the layer. A blue image is obtained on the transparent support.

EXAMPLE 10

Preparation of the light-sensitive material 15 g. of a fine blue pigment paste having a pigment content of 35% by weight, e.g. Helioechtblau BV paste of Farbenfabriken Bayer AG, are stirred into 400 ml. of ethylene glycol monomethyl ether using a high speed stirrer. 350 ml. of a 2% solution of Compound B–8 in methyl glycol and 600 ml. of ethyl alcohol are then added and the mixture is cast on a layer support of baryta-coated paper. The thickness of the dried layer is 3$\mu$. A layer of compound LV–12 which is free from binder and which contains about 500 mg. of substance per m.$^2$ is applied to the dried pigment layer from a 1.5% solution in chloroform.

Processing: The material is exposed through a transparent original for 30 seconds, using a UV lamp (Osram HQA 400 w. KmZ.) at a distance of 20 cm. The layer is then passed through sponge rollers moistened with water (e.g. wash off apparatus Transparex W 20 of Agfa-Gevaert AG) to wash out the unexposed parts of the layer. A deep blue image is obtained on a white ground.

EXAMPLE 11

Preparation of the light-sensitive material 12 g. of a fine black pigment paste having a pigment content of 35% by weight, e.g. Helioechtschwarz V paste of Farbenfabriken Bayer AG (lamp black pigment) are stirred into 600 ml. of ethylene glycol monomethyl ether using a high speed stirrer. 180 g. of a 2% aqueous solution of Compound B–6 and 600 ml. of ethyl alcohol are then added and the mixture is cast on a layer support of polyethylene terephthalate. The thickness of the layer when dry in 1$\mu$. A layer of Compound LV–50 which is free from binder and which contains about 700 mg. of substance is applied to the dried pigment layer from a 1.5% solution in chloroform.

Processing: The material is exposed through a transparent original for 60 seconds, using a UV lamp (Osram HQA 400 w. KmZ.) at a distance of 20 cm. The layer is then passed through sponge rollers moistened with water to wash out the unexposed parts of the layer. A blue image is obtained on a transparent ground.

EXAMPLE 12

15 g. of a fine blue pigment paste having a pigment content of 35% by weight, e.g. Helioechtblau BV paste of Fabrenfabriken Bayer AG, are stirred into 600 ml. of ethylene glycol monomethylether, using a high speed stirrer. 80 g. of a 4.5% aqueous solution of hydroxypropyl cellulose containing 32.5% by weight of Compound A–28, based on the dry weight of hydroxypropyl cellulose, and 600 ml. of ethyl alcohol are then added and the mixture is cast on a support of polyethylene terephthalate. The thickness of the dried layer is 1$\mu$. A layer of Compound LV–12 which is free from binder and which contains about 500 mg. of substance per m.$^2$ is applied to the dried pigment layer from a 1.5% solution in chloroform.

23.5% of Compound A–31 or 24.5% of Compound A–34 may be used instead of Compound A–28.

Exposure and development are carried out as described in the previous example. The copies obtained are very smudge resistant.

EXAMPLE 13

15 g. of a fine blue pigment paste having a pigment content of 35% by weight, e.g. Helioechtblau BV paste of Farbenfabriken Bayer AG, are stirred into 600 ml. of cyclohexanone, using a high speed stirrer. 10 g. of light-sensitive Compound LV–12 are then dissolved in another 600 ml. of cyclohexanone by heating to 60° C., and 100 g. of a 5.3% solution of Compound B–2 in ethylene glycol monomethyl/ethanol 1:1 are then added.

This solution is added to the mixture of pigment and cyclohexanone with vigorous stirring and the mixture is cast on a layer support of baryta paper. The thickness of the layer when dry is 2$\mu$, the layer containing about 1 g. of Compound LV–12 per m.$^2$.

The material is then processed as described in Example 1. A deep blue image is obtained on a white background.

We claim:

1. A photographic material comprising a supported light-sensitive layer containing a cyclic light-sensitive aryl polycarboxylic acid imide with two imide groups the said material contains a pigment layer on a transparent or opaque support, which pigment layer contains a pigment the color of which provides a high contrast to the support, the cyclic light-sensitive aryl polycarboxylic acid imide being contained either in this pigment layer or in a separate layer arranged above the pigment layer, the light-sensitive layer containing a compound which has at least one olfinic double bond or a compound capable of forming olefinic double bonds and capable of polymerizing or cross-linking when exposed to light in the presence of the cyclic aryl polycarboxylic acid imide.

2. The material of claim 1, wherein the aryl polycarboxylic acid imide has the following formula:

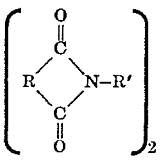

wherein

R=aryl having one or more condensed benzene rings;
R′=(I) XZ, (II) hydrogen, (III) a saturated or olefinically unsaturated aliphatic group, (IV) a saturated or unsaturated cycloaliphatic radical, (V) a dihydropyran radical, the above mentioned cyclic radicals being attached to the nitrogen atom either directly or via an alkylene bridge, and (VI) a 5-membered or 6-membered ring which has a cyclopropane group;

wherein

X=(I) a saturated or olefinically unsaturated aliphatic chain, which chain may be interrupted by oxygen, sulfur or the group $>NR^{II}$, a phenylene ring or a cycloaliphatic ring, (II) a saturated or unsaturated cycloaliphatic radical and (III) a single chemical bond;
Z=—$OR^{II}$, $$-N(R^{II})(R^{III})$$

or nitrile;

wherein $R^{II}$=hydrogen, a saturated or olefinically unsaturated aliphatic group or cycloalkyl;
$R^{III}$=an aliphatic saturated or olenfically unsaturated group or cycloalkyl;
or $R^{II}$ and $R^{III}$ may together denote the ring members required for completing a saturated heterocyclic ring.

3. The material of claim 1, wherein the compounds having at least one olefinic double bond are vinyl carbonyl or vinyl sulfonyl compounds.

4. The material of claim 3, wherein the compounds having at least one olefinic double bond are derivatives of acrylic or methacrylic acid.

5. The material of claim 3, wherein the compounds have the following formulae:

(I) $CH_2{=}C(R^{V})—CO—R^{IV}$ (II)

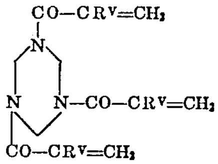

(III) $CH_2{=}CR^{V}—SO_2—Z'—SO_2—CR^{V}{=}CH_2$ (IV)

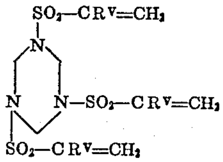

(V) $CH_2{=}CR^{V}—CO—Z'—CO—CR^{V}{=}CH_2$ wherein $R^{IV}$=hydroxyl, alkoxy, aroxy or an amino group,
$R^{V}$=hydrogen or alkyl,
Z′=an organic bridging member which may be interrupted by hetero atoms, an imino group, an ammonium group or the group NH—$(CH_2)_{1-10}$—NH.

6. The material of claim 1, wherein the compound is capable of forming olefinic double bonds, has the following formulae:

$Y—CH_2—CH_2—CO—Z—CO—CH_2—CH_2—Y$

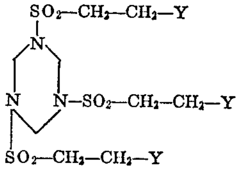

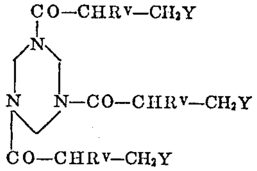

$Y—CH_2—CH_2—N(R)—CO—N(R)—CH_2—CH_2—Y$ $Y—CH_2—CH_2—SO_2—Z—S_2—CH_2—CH_2—Y$

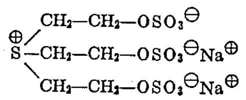

wherein Y=(I) an amino or ammonium group; (II) carbalkoxy; (III) halogen; or (IV) sulfate.

7. The material of claim 3, wherein the compound having at least one olefinic double bond, is a polysaccharide the hydroxyl groups of which are completely or partly substituted with vinyl carbonyl or vinyl sulfonyl groups.

8. The material of claim 3, wherein the compound having at least one olefinic double bond is a polymer which form contains in polymerized form units of vinyl alcohol substituted with vinyl carbonyl or vinyl sulfonyl groups.

9. The material of claim 7, wherein the compound having at least one olefinic double bond is a hydroxy alkyl cellulose substituted with acryloyl or methacryloyl groups.

References Cited

UNITED STATES PATENTS

| | | | |
|---|---|---|---|
| 3,533,798 | 10/1970 | Muller et al. | 96—90 R |
| 3,622,321 | 11/1971 | Smets et al. | 96—115 P |
| 3,681,075 | 8/1972 | Ranz et al. | 96—90 R |
| 3,694,208 | 9/1972 | Ranz et al. | 96—90 R |
| 3,712,814 | 1/1973 | Ranz et al. | 96—90 R |

RONALD H. SMITH, Primary Examiner

U.S. Cl. X.R.

96—35.1, 67, 87 R, 90 R, 115 P, 115 R